(12) United States Patent
Baxter

(10) Patent No.: US 12,704,076 B2
(45) **Date of Patent: *Aug. 11, 2026**

(54) LATENT HEAT AND CONDENSATION EXCHANGER

(71) Applicant: Sustainable Energy Solutions, Inc., Ball Ground, GA (US)

(72) Inventor: Larry Baxter, Orem, UT (US)

(73) Assignee: Sustainable Energy Solutions, Inc., Ball Ground, GA (US)

( * ) Notice: Subject to any disclaimer, the term of this patent is extended or adjusted under 35 U.S.C. 154(b) by 238 days.

This patent is subject to a terminal disclaimer.

(21) Appl. No.: 18/423,559

(22) Filed: Jan. 26, 2024

(65) Prior Publication Data

US 2024/0255221 A1 Aug. 1, 2024

Related U.S. Application Data

(60) Provisional application No. 63/481,916, filed on Jan. 27, 2023.

(51) Int. Cl.
*F01D 15/10* (2006.01)
*B01D 3/40* (2006.01)
(Continued)

(52) U.S. Cl.
CPC ............... *F01D 15/10* (2013.01); *B01D 3/40* (2013.01); *B01D 53/002* (2013.01); (Continued)

(58) Field of Classification Search
CPC ...... B01D 2252/102; B01D 2252/2021; B01D 2252/204; B01D 2257/504;
(Continued)

(56) References Cited

U.S. PATENT DOCUMENTS 8,425,655 B2 * 4/2013 Chen .................. B01D 19/0005 95/227
9,248,397 B2 2/2016 Oohashi et al.
(Continued)

FOREIGN PATENT DOCUMENTS

| CN | 101053809 A | 10/2007 |
|---|---|---|
| CN | 106931807 A | 7/2017 |
| CN | 206934982 U | 1/2018 |

OTHER PUBLICATIONS

International Search Report and Written Opinion, counterpart International App. No. PCT/US2024/013150 (Oct. 28, 2024) (15 pages).

*Primary Examiner* — Filip Zec
(74) *Attorney, Agent, or Firm* — Edell, Shapiro & Finnan, LLC

(57) ABSTRACT

Systems and methods for separation of a component from a mixed gas stream by a combination of direct contact heat and material exchange in an indirect contact heat exchanger are disclosed. A contact liquid stream wets an interior surface of the process channel of the indirect contact heat exchanger and the mixed gas stream passes through the process channel, contacting the contact liquid stream for heat and mass exchange. A refrigerant in the refrigerant channel of the indirect contact heat exchanger is used for heat exchange with the contact liquid.

20 Claims, 3 Drawing Sheets

(51) Int. Cl.

| | |
|---|---|
| ***B01D 53/00*** | (2006.01) |
| ***B01D 53/14*** | (2006.01) |
| ***B01D 53/18*** | (2006.01) |
| ***B01D 53/26*** | (2006.01) |
| ***B01D 53/30*** | (2006.01) |
| ***F25J 3/06*** | (2006.01) |

(52) U.S. Cl.
CPC ....... *B01D 53/1406* (2013.01); *B01D 53/145* (2013.01); *B01D 53/1475* (2013.01); *B01D 53/1493* (2013.01); *B01D 53/18* (2013.01); *B01D 53/263* (2013.01); *B01D 53/265* (2013.01); *B01D 53/30* (2013.01); *F25J 3/062* (2013.01); *B01D 2252/102* (2013.01); *B01D 2252/2021* (2013.01); *B01D 2252/204* (2013.01); *B01D 2257/504* (2013.01); *B01D 2257/80* (2013.01); *B01D 2258/0283* (2013.01); *F05D 2260/20* (2013.01)

(58) Field of Classification Search
CPC ........ B01D 2257/80; B01D 2258/0283; B01D 3/40; B01D 51/10; B01D 53/002; B01D 53/1406; B01D 53/1418; B01D 53/145; B01D 53/1475; B01D 53/1493; B01D 53/18; B01D 53/263; B01D 53/265; B01D 53/30; F25J 2220/82; F25J 2230/30; F25J 2240/90; F25J 2260/02; F25J 3/0266; F25J 3/062; F23J 15/06; F23J 2215/50
See application file for complete search history.

(56) References Cited

U.S. PATENT DOCUMENTS

| | | | | |
|---|---|---|---|---|
| 9,545,595 | B2 * | 1/2017 | Find | B01D 53/1475 |
| 10,130,897 | B2 * | 11/2018 | Grave | C10L 3/106 |
| 10,153,193 | B2 * | 12/2018 | Yang | H10D 84/01 |
| 10,300,429 | B2 * | 5/2019 | Grave | B01D 53/1462 |
| 10,343,107 | B2 * | 7/2019 | Northrop | B01F 25/31331 |
| 10,391,442 | B2 * | 8/2019 | Freeman | C10L 3/104 |
| 11,090,604 | B2 * | 8/2021 | Northrop | B01D 53/1462 |
| 11,377,401 | B2 * | 7/2022 | Sibal | C07C 7/005 |
| 11,413,571 | B2 * | 8/2022 | Cullinane | B01D 53/1406 |
| 11,662,141 | B2 * | 5/2023 | Calderon | F25J 1/0085 62/630 |
| 12,097,465 | B2 * | 9/2024 | Kimtantas | B01D 53/62 |
| 2012/0174783 | A1 * | 7/2012 | Leister | B01D 53/1425 95/251 |
| 2013/0071307 | A1 * | 3/2013 | Engelke | C12M 47/18 423/220 |
| 2014/0007590 | A1 * | 1/2014 | Huntington | F02C 3/04 60/801 |
| 2014/0338394 | A1 * | 11/2014 | Oohashi | B01D 53/1475 62/617 |
| 2015/0251129 | A1 * | 9/2015 | Heirman | B01D 53/80 95/190 |
| 2017/0014760 | A1 * | 1/2017 | Stauffer | B01D 53/62 |
| 2018/0071674 | A1 * | 3/2018 | Freeman | B01D 53/1475 |
| 2018/0340731 | A1 * | 11/2018 | Baxter | B01D 53/1493 |
| 2020/0078730 | A1 * | 3/2020 | Melin | B01D 53/75 |
| 2020/0346163 | A1 * | 11/2020 | Benali | B01D 53/1456 |

* cited by examiner

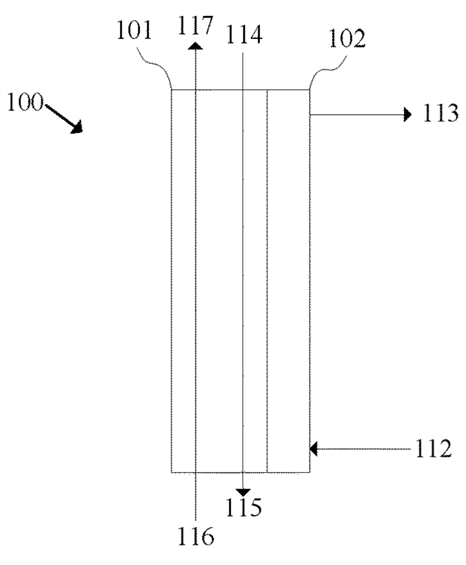
Fig. 1
201
217
214
202
200
213
212
221
203
220
223
204
222
225
224
215
216
205
Fig. 2
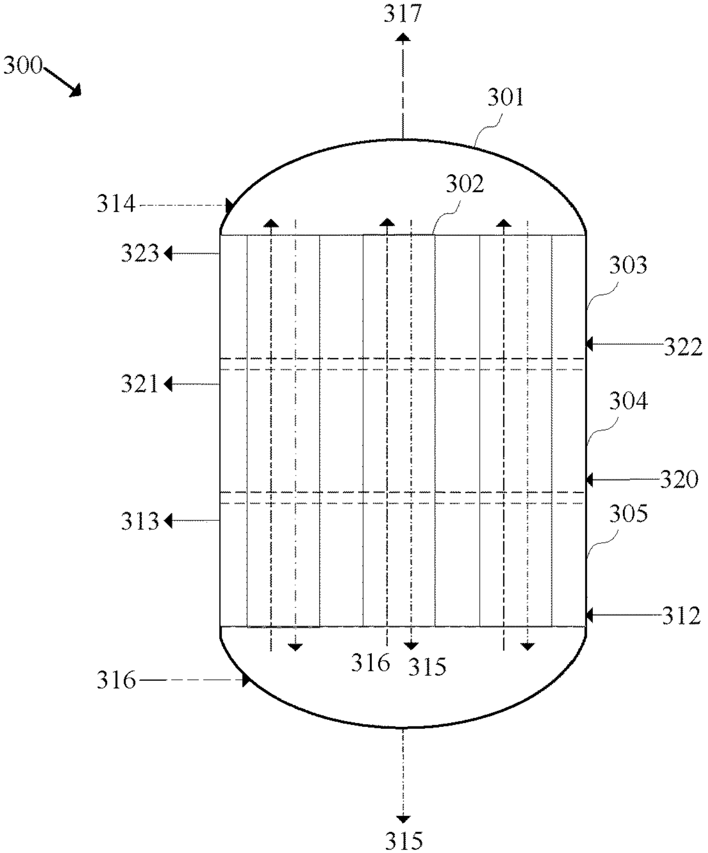
Fig. 3

LATENT HEAT AND CONDENSATION EXCHANGER

CLAIM OF PRIORITY

This application claims the benefit of U.S. Provisional Patent Application No. 63/481,916, filed Jan. 27, 2023, the contents of which are hereby incorporated by reference.

FIELD OF DISCLOSURE

The methods and processes described herein relate generally to heat and mass exchange. More particularly, the methods and processes described herein relate to gas separations.

BACKGROUND

Flue gas, syngas, and other gases frequently require removal of carbon dioxide, other acid gases, and contaminants and a variety of methods fill these needs such as scrubbers, absorbers, catalytic conversion, condensation, and similar gas separation processes. These methods can have limitations, including high energy requirements, inefficiencies, and expense. Vapor removal from a gas stream is important and improved devices, methods, and systems could be beneficial.

SUMMARY

In a first aspect, the disclosure provides a method for removing a first component from a mixed gas stream. A refrigerant stream passes through a first channel of an indirect contact heat exchanger. A contact liquid stream passes through a second channel of the indirect contact heat exchanger such that the contact liquid stream wets interior wall of the second channel. A mixed gas stream also passes through a center of the second channel either cocurrent or countercurrent to the liquid stream such that the mixed gas stream and the contact liquid stream exchange heat, mass, or heat and mass. The system may include sensible heat exchange between the two phases, in which case the contact liquid stream exchanges heat with the mixed gas stream, transmits a first portion of the heat through the interior wall of the second channel to the interior wall of the refrigerant stream in the first channel, and retains the balance of the heat stream. The system preferably operates with minimal sensible heat exchange and in all cases that involve mass transfer between the two streams, the first component condenses or absorbs from the mixed gas stream into the contact liquid stream, resulting in a depleted gas stream and an enriched contact liquid stream, and generating an amount of heat associated with the condensation or absorption that at least partially transfers from the contact liquid, through the wall that separates the two streams, and into the second stream.

In a second aspect, the disclosure provides a method for removing a first component from a mixed gas stream. A refrigerant stream passes through a first channel of an indirect contact heat exchanger. A contact liquid stream passes through a second channel such that the contact liquid stream wets an interior wall of the second channel. A mixed gas stream also passes through a center of the second channel such that the mixed gas stream and the contact liquid stream exchange heat, mass, or heat and mass. The contact liquid stream receives heat from the mixed gas stream and passes the heat to the refrigerant stream, the contact liquid stream and the mixed gas stream remaining substantially isothermal through the second channel and, in embodiments in which the refrigerant vaporizes, which are preferred, the refrigerant stream may remain essentially isothermal. The first component condenses from the mixed gas stream into the contact liquid stream, resulting in a depleted gas stream and an enriched contact liquid stream.

In a third aspect, the disclosure provides a system for removing a first component from a mixed gas stream. An indirect contact heat exchanger includes a process channel and one or more refrigerant channels, the process channel sharing walls with the one or more refrigerant channels. The process channel is configured to receive a contact liquid stream through an inlet of the process channel and wet an inner surface of the process channel with the contact liquid stream while leaving a gas space inside the process channel. The process channel is further configured to receive the mixed gas stream through the inlet of the process channel and pass the mixed gas stream through the gas space. The one or more refrigerant channels are configured to each receive one of a group of refrigerant streams from one or more refrigerant controllers. One or more instruments are situated at least on an inlet of the process channel, an outlet of the process channel, or both. The one or more instruments are configured to measure one or more process variables of the process channel and transmit the one or more process variables to a main controller. The main controller is programmed to receive the one or more process variables and send a signal to each of the one or more refrigerant controllers. The one or more refrigerant controllers are configured to control a flow rate of one of the group of refrigerant streams to each of the one or more refrigerant channels to maintain the one or more process variables in the contact liquid stream at a setpoint. The mixed gas stream condenses the first component into the contact liquid stream. The mixed gas stream passes a heat stream to the contact liquid stream. The contact liquid stream transmits a first portion of the heat stream to the one of the group of refrigerant streams. The contact liquid stream retains a balance of the heat stream.

In a fourth aspect, a device includes the first and second channels as described above arranged in a stack, preferably with the first and second channels alternating. The channel cross sectional areas control fluid velocities in each channel while the channel length controls the contact time between the streams. The number of channels controls the total flow rates the device can manage.

Further aspects and embodiments are provided in the foregoing drawings, detailed description and claims.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

FIG. 1 is a process diagram showing a method for separating a component from a gas stream.

FIG. 2 is a process diagram showing a method for separating a component from a gas stream.

FIG. 3 is a cutaway elevation view showing a heat exchange system for separating a component from a gas stream.

DETAILED DESCRIPTION

Figure 4:
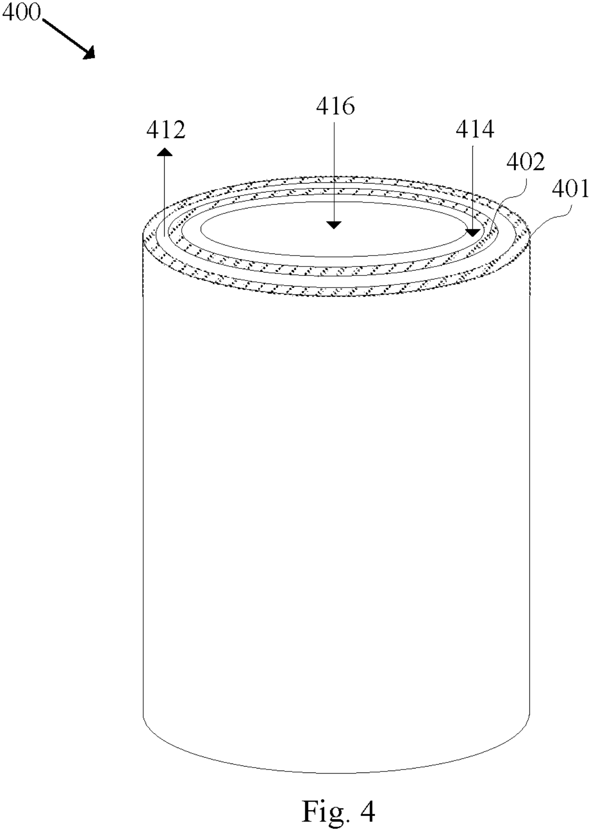
FIG. 4 is an isometric view of a section of a pipe-in-pipe for separating a component from a gas stream.

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms “a,” “an,” and “the” include plural referents unless the context clearly dictates otherwise. For example, reference to “a substituent” encompasses a single substituent as well as two or more substituents, and the like.

As used herein, “for example,” “for instance,” “such as,” or “including” are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, “condensing” is meant to refer to the process of a vapor being cooled to a liquid.

As used herein, “desublimating” is meant to refer to the process of a vapor being cooled to a solid. As used herein, “cryogenic” is intended to refer to temperatures below about −58° F. (−50° C.).

Combustion flue gas consists of the exhaust gas from a fireplace, oven, furnace, boiler, steam generator, or other combustor. The combustion fuel sources include coal, hydrocarbons, and bio-mass. Combustion flue gas varies greatly in composition depending on the method of combustion and the source of fuel. Combustion in pure oxygen produces little to no nitrogen in the flue gas. Combustion using air leads to the majority of the flue gas consisting of nitrogen. The non-nitrogen flue gas consists of mostly carbon dioxide, water, and sometimes unconsumed oxygen. Small amounts of carbon monoxide, nitrogen oxides, sulfur dioxide, hydrogen sulfide, and trace amounts of hundreds of other chemicals are present, depending on the source. Entrained dust and soot will also be present in all combustion flue gas streams. The method disclosed applies to any combustion flue gases. Dried combustion flue gas has had the water removed.

Syngas consists of hydrogen, carbon monoxide, and carbon dioxide.

Producer gas consists of a fuel gas manufactured from materials such as coal, wood, or syngas. It consists mostly of carbon monoxide, with tars and carbon dioxide present as well.

Steam reforming is the process of producing hydrogen, carbon monoxide, and other compounds from hydrocarbon fuels, including natural gas. The steam reforming gas referred to herein consists primarily of carbon monoxide and hydrogen, with varying amounts of carbon dioxide and water.

Light gases include gases with higher volatility than water, including hydrogen, helium, carbon dioxide, nitrogen, and oxygen. This list is for example only and should not be implied to constitute a limitation as to the viability of other gases in the process. A person of skill in the art would be able to evaluate any gas as to whether it has higher volatility than water.

Refinery off-gases comprise gases produced by refining precious metals, such as gold and silver. These off-gases tend to contain significant amounts of mercury and other metals.

Mixed gas streams, such as flue gas, syngas, producer gas, and refinery off gases, tend to contain moisture in varying amounts. With the recent push for carbon dioxide sequestration, moisture removal is generally critical before carbon dioxide removal can be attempted. Without water removal, the typically cryogenic temperatures of carbon dioxide sequestration can result in ice blocking the unit operations. Methods for water removal are extremely varied, including distillation, ice making, and even desiccation. All of these methods are either extremely energy intensive, require batch operations, or are extraordinarily expensive. Embodiments of the disclosure overcome at least some of these and other issues that will be apparent to a person of skill in the art.

A combination of indirect contact heat exchange and direct contact heat and mass exchange is utilized to remove a vapor component, such as water, from a mixed gas stream, such as flue gas. The water/flue gas example will be used to summarize this method, but a person of skill in the art could use this method for removal of a variety of vapor components from a variety of mixed gas streams. The indirect contact heat exchanger has a refrigerant channel that carries a refrigerant stream to extract heat from a contact liquid stream that is carried in a process channel of the same indirect contact heat exchanger. The process channel carries the contact liquid in a quantity that wets the inner surfaces of the process channel. The flue gas stream passes through the balance of the volume of the process channel. In a preferred embodiment, the contact liquid stream wets the inner surfaces of the process channel which results in the flue gas stream rarely contacting the inner surfaces. In a more preferred embodiment, the contact liquid stream entirely prevents the flue gas stream from contacting the inner surfaces. The flue gas stream passes through the process channel with water as a component. As the flue gas passes across the contact liquid, the moisture condenses out of the flue gas into the contact liquid.

In embodiments of the disclosure, the amount of contact liquid required is minimized—only enough to coat the surfaces of the process channel. This is because there is always some amount of carbon dioxide that dissolves out of the flue gas into the contact liquid. By minimizing this volume, the amount of carbon dioxide becomes trivial in regenerating the contact liquid. The water removal step where large volumes of contact liquid are processed can produce large amounts of carbon dioxide that desublimate out, clogging exchangers and vessels. Embodiments of the disclosure provide a liquid to condense out the water from the flue gas, but not enough to remove a significant amount of caron dioxide. Further, by minimizing the contact liquid, the amount of carbon dioxide that can condense into the contact liquid at the inlet of the flue gas and vaporize out of the contact liquid at the outlet of the contact liquid is minimized, limiting disruptions to the temperature profile of the contact liquid.

In one embodiment, the contact liquid stream enters at a lower temperature and leaves at a higher temperature. In a preferred embodiment, the contact liquid stream is isothermal across the entire channel.

Examples of systems that this invention can treat include but are not limited to: $CO_2$ removal from flue gas, syngas, natural gas, biogas, and process gas; $H_2O$ removal from most moisture-carrying gases; $SO_x$ removal from vitiated flows and other sulfur-containing gases; and absorption/condensation of any gas component by a contact liquid capable of absorbing some portion of the component.

Now referring to FIG. 1, FIG. 1 is a process diagram showing a method for separating a component from a mixed gas stream containing a first component that may be used in one embodiment of the present invention. This is referred to as an extracting exchange process. A process channel 101 and a refrigerant channel 102 make up an indirect contact heat exchanger 100. A refrigerant stream 112 enters and passes up the refrigerant channel 102. A contact liquid stream 114 enters and passes down the process channel 101. The refrigerant and contact liquid can be either counter current, as illustrated, cocurrent, or cross current. The contact liquid stream 114 is of sufficient volumetric flow to wet the surface of the process channel 101 but not to fill the entire or even a substantial portion of the process channel 101. As a result, the contact liquid stream has a hollow concentric rectilinear or annular flow profile. The contact liquid 114 preferably wets but does not soak into or adhere to the surface(s) of the process channel 101. The liquid preferably flows in a sheet that covers the surface(s) so that beading is avoided. As examples only, the surface(s) may have similar polarity as the liquid, may contain oxidized layers or polished layers as appropriate to promote wetting, may have increased surface roughness, anodization, coatings, etching to promote surface coating, and/or the contact liquid or the channel surface may include a surfactant. This applies to the process channels in the following embodiments as well. A mixed gas stream 116 passes up the balance of the volume of the process channel 101. Mass and possibly heat exchange occur between the mixed gas stream 116 and the contact liquid stream 114. Preferably, the mixed gas stream 116 and the contact liquid stream 114 flow countercurrently to maximize the amount of the first component in the gas that absorbs or condenses in the liquid. For mass exchange, the first component from the mixed gas stream 116 condenses, absorbs, or desublimates into the contact liquid stream 114. For heat exchange, in a most preferred embodiment, no heat is transferred from the mixed gas stream 116 into the contact liquid stream 114 but the amount of heat generated by the absorption/condensation/desublimation of the gas component is transferred from the contact liquid stream 114 into the refrigerant stream 112, resulting in a minimal temperature gradient in the typically thin contact liquid stream 114. In this mode of operation, there is no substantial temperature gradient in any of the streams in the streamwise direction and only enough temperature gradient in the steams in the lateral direction to effect the heat transfer. The heat and mass exchange results in a depleted gas stream 117, an enriched contact liquid stream 115, and a partially vaporized or warmed refrigerant stream 113. In an alternative to this embodiment, both sensible heat exchange and heat exchange associated with absorption/condensation/desublimation occur and the streams develop a stream-wise temperature gradient in addition to the lateral temperature gradient.

Absorption occurs when the gas component is above it dewpoint temperature or, equivalently, below its dewpoint concentration or its vapor pressure at the temperature of the liquid. That is, a gas that would not condense on an inert surface maystill absorb in a liquid. Condensation occurs when the gas is at or below its dewpoint temperature or, equivalently, at or above its dewpoint concentration or vapor pressure of the liquid/surface. Desublimation is the same as (liquid) condensation except that the conditions are such that the gas goes directly from vapor to solid and does not form a liquid.

In another embodiment, the first component condenses out of the mixed gas stream 116 and heat is extracted from the mixed gas stream 116 by the contact liquid stream 114 and the refrigerant stream 112 extracts the heat from the contact liquid stream 114. In this embodiment, the contact liquid stream 114 may be isothermal or non-isothermal.

FIG. 2 is a process diagram showing a method for separating water vapor from a flue gas stream that may be used in one embodiment of the present invention. This is referred to as an extracting exchange process. A process channel 201 and a series of refrigerant channels 202, 203, 204, and 205 make up an indirect contact heat exchanger 200. A first refrigerant stream 212 enters and passes up the refrigerant channel 202. A second refrigerant stream 220 enters and passes up the refrigerant channel 203. A third refrigerant stream 222 enters and passes up the refrigerant channel 204. A fourth refrigerant stream 224 enters and passes up the refrigerant channel 205. A methanol liquid stream 214, acting as the contact liquid, enters and passes down the process channel 201. The methanol liquid stream 214 is of sufficient volumetric flow to wet the surface of the process channel 201 but not to fill the entire process channel 201. A flue gas stream 216 passes up the balance of the volume of the process channel 201. Heat and mass exchange occurs between the flue gas stream 216 and the methanol liquid stream 214. For mass exchange, essentially all of the water vapor from the flue gas stream 216 condenses into the contact liquid stream 214. For heat exchange, in a most preferred embodiment, an amount of heat is transferred from the flue gas stream 216 into the methanol liquid stream 214 and the same amount of heat is transferred from the methanol liquid stream 214 into the refrigerant streams 212, 220, 222, and 224, resulting in the methanol liquid stream 214 staying isothermal across the entire process channel 201. The heat and mass exchange results in a dry flue gas stream 217, an enriched contact liquid stream 215, and warmed refrigerant streams 213, 221, 223, and 225. The benefit of having multiple refrigerant streams is that the temperature of the methanol liquid stream 214 is controlled by having each section of refrigerant enter at a temperature and flow rate to keep the methanol liquid stream 214 isothermal. With this design, control can be increased in granularity by having more refrigerant channels at their own temperature and flow rates. While four refrigerant channels are illustrated, an alternative number may be used in other embodiments.

In a preferred version of this embodiment, the flue gas stream 216 is cooled to a temperature below the frost point of the water vapor, resulting in the essentially all of the water vapor condensing out of the flue gas stream 216. In a preferred embodiment, essentially all of the water vapor is 99% of the water vapor in the flue gas stream 216. In a more preferred embodiment, essentially all of the water vapor is 99.9% of the water vapor in the flue gas stream 216. In a most preferred embodiment, essentially all of the water vapor is 99.99% of the water vapor in the flue gas stream 216.

In one embodiment, the methanol liquid stream 214 consists entirely of methanol. In a preferred embodiment, the methanol liquid stream 214 consists of a mix of methanol and ethanol. In some embodiments, the methanol liquid stream 214 contains some water at the entrance to the process channel 201. In one embodiment, the methanol liquid stream enters the process channel 201 saturated in carbon dioxide such that isothermal operation means no carbon dioxide dissolves from the flue gas stream 216 into the methanol liquid stream 214.

In another embodiment, the contact liquid stream 214 consists entirely of ethanol.

FIG. 3 is a cutaway elevation view showing a shell and tube style extracting exchanger utilizing system for separating a first component from a gas stream that may be used in one embodiment of the present invention. The extracting exchanger 300 consists of a process channel 301 made up of a bundle of tubes 302 through which the mixed gas stream 316 and contact liquid stream 314 pass. The extracting exchanger 300 is also made up of a series of refrigerant channels 303, 304, and 305. A first refrigerant stream 312 enters and passes up the refrigerant channel 303. A second refrigerant stream 320 enters and passes up the refrigerant channel 304. A third refrigerant stream 322 enters and passes up the refrigerant channel 305. A contact liquid stream 314 enters and passes down the bundle of tubes 302. The contact liquid stream 314 is of sufficient volumetric flow to wet the surface of the bundle of tubes 302 but not to fill the entire process channel 301, resulting in the contact liquid stream having an annular flow profile. A mixed gas stream 316 passes up the center of the annular flow profile. Heat and mass exchange occurs between the flue gas stream 316 and the contact liquid stream 314. For mass exchange, the first component from the flue gas stream 316 condenses into the contact liquid stream 314. An amount of heat is transferred from the flue gas stream 316 into the contact liquid stream 314. In one embodiment, the amount of heat is split into two portions. A first portion of the amount of heat is transferred from the contact liquid stream 314 into the refrigerant streams 312, 320, and 322. A second portion of the amount of heat is retained in the contact liquid stream 314 and raises the temperature of the resultant enriched contact liquid stream 315. The heat and mass exchange results in a dry flue gas stream 317, the enriched contact liquid stream 315, and warmed refrigerant streams 313, 321, and 323. In a more preferred embodiment, all of the amount of heat is transferred from the contact liquid stream 314 into the refrigerant streams 312, 320, and 322, resulting in the contact liquid stream 314 staying isothermal across the entire process channel 301. The number of refrigeration channels may be varied from the number illustrated.

FIG. 4 is an isometric view of a section of a pipe-in-pipe style extracting exchanger for separating a first component from a mixed gas stream that may be used in one embodiment of the present invention. An inner pipe 402 passes through the center of a vertical outer pipe 401, resulting in an outer annular space between outer pipe 401 and inner pipe 402 and a cylindrical space inside of inner pipe 402. A refrigerant stream 412 passes through the outer annular space. A contact liquid stream 414 passes down through the cylindrical space such that the contact liquid stream 414 wets the inner wall of the inner pipe 402 in an annular film, leaving an inner space through which a mixed gas stream 416 can pass. In FIG. 4, the mixed gas stream 416 passes downward through the inner space. In other embodiments, the mixed gas stream 416 passes upward through the inner space. Passing the mixed gas stream 416 and the contact liquid stream 414 against each other causes them to engage in heat and mass exchange. The contact liquid stream 414 receives heat from the mixed gas stream 416 and the first component condenses from the mixed gas stream 416 into the contact liquid stream 414. The contact liquid stream 414 transmits a first portion of the heat through the inner pipe 402 into the refrigerant stream 412. The contact liquid stream 414 retains a second portion of the heat as it leaves the inner pipe 402 as an enriched contact liquid stream. The flue gas stream 416 leaves as a depleted flue gas stream. In one embodiment, the second portion of heat is zero, meaning the first portion of the heat is all of the heat, resulting in the contact liquid stream 414 staying isothermal from the inlet to the outlet of the inner pipe 402. In another embodiment, the second portion of heat is non-zero, resulting in the contact liquid stream 414 increasing or decreasing in temperature from the inlet to the outlet of the inner pipe 402.

Figure 5:
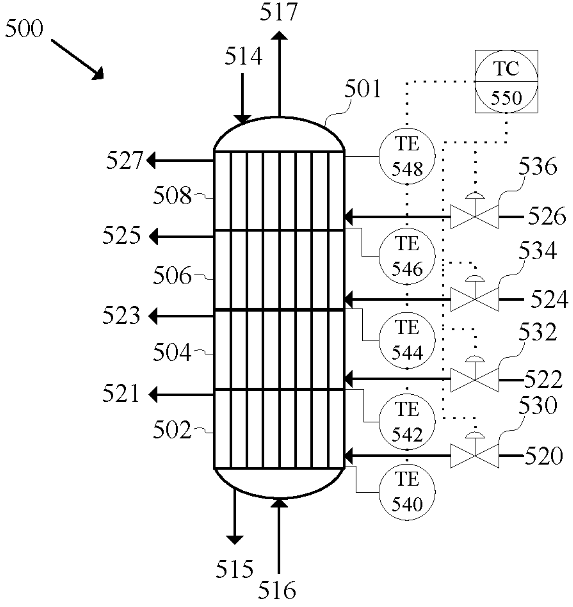
FIG. 5 is a block flow diagram showing a method for separating a component from a gas stream.

FIG. 5 is a block flow diagram showing a system for separating a component from a gas stream that may be used in one embodiment of the present invention. This is referred to as an extracting exchange process. An indirect contact heat exchanger 500 consists of a process channel 501 and four refrigerant channels, 502, 504, 506, and 508. The process channel is made up of a tube bundle and the tube walls are in contact with the refrigerant channels. The refrigerant channels 502, 504, 506, and 508 each have a refrigerant that passes through them, 520, 522, 524, and 526. The refrigerants vary in chemical makeup, temperature, and flow rate. The refrigerant chemical makeup, temperature, and flow rates are chosen to conduct heat exchange across the tube walls at a rate that produces a desired temperature profile in the process channel 501. The number of refrigeration channels may be varied from the number illustrated.

The process channel 501 is configured to receive a contact liquid stream 514 through an inlet of the process channel 501 and wet an inner surface of the process channel 501 with the contact liquid stream 514 while leaving a gas space in a center volume of each of the tubes of the process channel 501, similar to FIG. 4. The process channel 501 is further configured to receive the mixed gas stream 516 through the inlet of the process channel 501 and pass the mixed gas stream 516 through the gas space in the center volume of the tubes of the process channel 501.

The refrigerant channels 502, 504, 506, and 508 are configured to each receive refrigerant streams 520, 522, 524, and 526, respectively, controlled by refrigerant controlling valves 520, 522, 524, and 526, respectively. In other embodiments, other control elements like pumps could be used. These valves are controlled by a main controller 550. The main controller 550 receives temperature data from temperature elements 540, 542, 544, 546, and 548 that measure the temperature of the contact liquid 514 at points through the tubes of the process channel 501. In a preferred embodiment, the main controller 550 sends a signal that varies the valves to provide refrigerant 520, 522, 524, and 526 at a rate that keeps the temperature profile isothermal.

In other embodiments, the temperature profile is maintained to increase or decrease the temperature as the contact liquid 514 passes through the exchanger 500.

The mixed gas stream 516 condenses the first component into the contact liquid stream 514. The mixed gas stream 516 passes a heat stream to the contact liquid stream 514. The contact liquid stream 514 transmits a first portion of the heat stream to the refrigerant streams 520, 522, 524, and 526. The contact liquid stream 516 retains a balance of the heat stream. In a preferred embodiment, the first portion of the heat stream is the entire heat stream and the contact liquid stream 516 stays isothermal.

The result of the heat and mass exchange of FIG. 5 is an enriched contact liquid stream 515, a depleted mixed gas stream 517, and spent refrigerant streams 521, 523, 525, and 527.

In some embodiments, as few as two temperature elements, one at the inlet and one at the outlet, are used.

In some embodiments, the mixed gas is selected from a group consisting of flue gas, natural gas, liquefied petroleum gas, and syngas.

In some embodiments, the mixed gas also contains a second component, specifically an acid gas. The acid gases are selected from the group consisting of carbon dioxide, sulfur oxides, nitrogen oxides, mercury, mercury oxides, carbon monoxide, other pollutants, and a combination thereof.

In some embodiments, the contact liquid stream is selected from the group consisting of water, isopentane, methanol, ethanol, and a combination thereof.

In one embodiment, the refrigerant stream is co-current to the contact liquid stream. In a most preferred embodiment, the refrigerant stream is counter current to the contact liquid stream.

In some embodiments, the mixed gas stream is counter current to the contact liquid stream.

Figure 6:
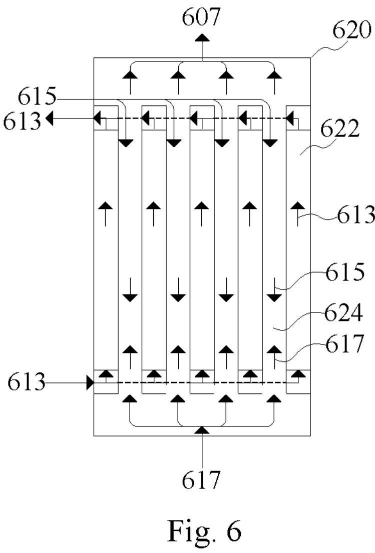
FIG. 6 is a process flow diagram showing an extracting exchanger.
Figure 7:
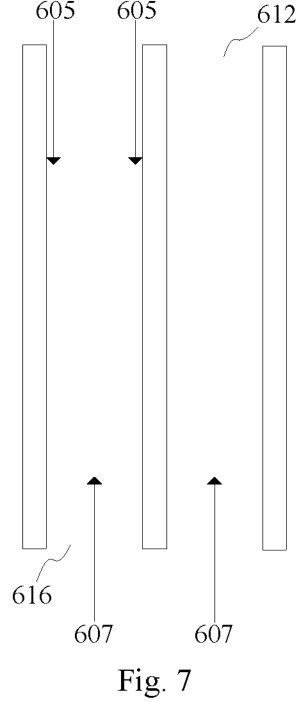
FIG. 7 is a process flow diagram showing a close-up of the exchanger of FIG. 6.

FIG. 6 is a process flow diagram showing an extracting exchanger that may be used in FIGS. 1, 2, and 3. FIG. 7 is a process flow diagram showing a close-up of the exchanger of FIG. 6. The extracting exchanger 620 is configured to pass the partially-depleted dry gas stream 617 upwards counter-current to a second contact liquid stream 615 directly and cool the second contact liquid stream 615 indirectly against a second refrigerant stream 613, condensing carbon dioxide from the partially-depleted dry gas stream 617 into the second contact liquid 615, resulting in the partially-enriched second contact liquid stream 619 and the depleted dry gas stream 607. A refrigerant 613 is passed through the second channels 622 to indirectly cool the first channels 624.

The invention has been described with reference to various specific and preferred embodiments and techniques. Nevertheless, it is understood that many variations and modifications may be made while remaining within the spirit and scope of the invention.

What is claimed is:

1. A method for removing a first component from a mixed gas stream comprising:
  - passing a refrigerant stream through a first channel of an indirect contact heat exchanger;
  - passing a contact liquid stream through a second channel of the indirect contact heat exchanger such that the contact liquid stream wets an interior wall of the second channel;
  - passing a mixed gas stream through a center of the second channel such that the mixed gas stream and the contact liquid stream exchange a heat, mass, or heat and mass;
  - wherein the contact liquid stream:
    - receives the heat from the mixed gas stream;
    - transmits a first portion of the heat through the interior wall of the second channel into the refrigerant stream; and
    - leaves the second channel while retaining a balance of the heat; and
  - wherein the first component condenses from the mixed gas stream into the contact liquid stream, resulting in a depleted gas stream and an enriched contact liquid stream.

2. The method of claim 1, wherein the first portion of the heat stream is all of the heat stream, causing the contact liquid stream to be isothermal throughout the second channel.

3. The method of claim 1, the mixed gas stream cooling to a temperature below a frost point of the first component.

4. The method of claim 1, wherein the balance of the heat stream is positive and a temperature of the contact liquid stream increases from an inlet of the second channel to an outlet of the second channel.

5. The method of claim 1, wherein the balance of the heat stream is negative and a temperature of the contact liquid stream decreases from an inlet of the second channel to an outlet of the second channel.

6. The method of claim 1, wherein the mixed gas stream is selected from a group consisting of flue gas, natural gas, liquefied petroleum gas, and syngas.

7. The method of claim 1, wherein the first component comprises water.

8. The method of claim 7, wherein the mixed gas stream further comprises a second component comprising acid gases selected from the group consisting of carbon dioxide, sulfur oxides, nitrogen oxides, mercury, mercury oxides, carbon monoxide, other pollutants, and a combination thereof.

9. The method of claim 1, wherein the contact liquid stream is selected from the group consisting of water, isopentane, methanol, ethanol, and a combination thereof.

10. The method of claim 1, wherein the refrigerant stream is counter current to the contact liquid stream.

11. The method of claim 10, wherein the mixed gas stream is counter current to the contact liquid stream.

12. A method for removing a first component from a mixed gas stream comprising:
  - passing a refrigerant stream through a first channel of an indirect contact heat exchanger;
  - passing a contact liquid stream through a second channel such that the contact liquid stream wets an interior wall of the second channel;
  - passing a mixed gas stream through a center of the second channel such that the mixed gas stream and the contact liquid stream exchange heat, mass, or heat and mass;
  - wherein the contact liquid stream receives heat from the mixed gas stream and passes the heat to the refrigerant stream, the contact liquid stream remaining isothermal through the second channel; and
  - wherein the first component condenses from the mixed gas stream into the contact liquid stream, resulting in a depleted gas stream and an enriched contact liquid stream.

13. The method of claim 12, wherein the first component is water vapor and the mixed gas stream further comprises carbon dioxide.

14. The method of claim 12, wherein the contact liquid stream comprises methanol, ethanol, or a combination thereof.

15. A system for removing a first component from a mixed gas stream comprising:

an indirect contact heat exchanger comprising a process channel and one or more refrigerant channels, the process channel sharing walls with the one or more refrigerant channels;

the process channel configured to receive a contact liquid stream through an inlet of the process channel and wet an inner surface of the process channel with the contact liquid stream while leaving a gas space inside the process channel;

the process channel further configured to receive the mixed gas stream through the inlet of the process channel and pass the mixed gas stream through the gas space;

the one or more refrigerant channels configured to each receive one of a group of refrigerant streams from one or more refrigerant controllers;

one or more instruments situated at least on an inlet of the process channel, an outlet of the process channel, or both;

the one or more instruments configured to measure one or more process variables of the process channel and transmit the one or more process variables to a main controller;

the main controller programmed to receive the one or more process variables and send a signal to each of the one or more refrigerant controllers;

the one or more refrigerant controllers configured to control a flow rate of one of the group of refrigerant streams to each of the one or more refrigerant channels to maintain the one or more process variables in the contact liquid stream at a setpoint; and wherein:

the mixed gas stream condenses the first component into the contact liquid stream;

the mixed gas stream passes a heat stream to the contact liquid stream;

the contact liquid stream transmits a first portion of the heat stream to the one of the group of refrigerant streams; and the contact liquid stream retains a balance of the heat stream.

16. The system of claim 15, wherein the first portion of the heat stream is all of the heat stream, causing the contact liquid stream to be isothermal throughout the process channel.

17. The system of claim 15, wherein the mixed gas stream is selected from a group consisting of flue gas, natural gas, liquefied petroleum gas, and syngas.

18. The system of claim 15, wherein the first component comprises water.

19. The system of claim 18, wherein the mixed gas stream further comprises a second component comprising acid gases selected from the group consisting of carbon dioxide, sulfur oxides, nitrogen oxides, mercury, mercury oxides, carbon monoxide, other pollutants, and a combination thereof.

20. The system of claim 15, wherein the contact liquid stream is selected from the group consisting of water, isopentane, methanol, ethanol, and a combination thereof.

* * * * *